US010264091B2

(12) United States Patent
Power et al.

(10) Patent No.: US 10,264,091 B2
(45) Date of Patent: Apr. 16, 2019

(54) PROXY SERVER FAILOVER AND LOAD CLUSTERING

(71) Applicant: Level 3 Communications, LLC, Broomfield, CO (US)

(72) Inventors: William R. Power, Boulder, CO (US); Paul K. McDonnell, Arvada, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 313 days.

(21) Appl. No.: 14/626,605

(22) Filed: Feb. 19, 2015

(65) Prior Publication Data

US 2015/0237155 A1    Aug. 20, 2015

Related U.S. Application Data

(60) Provisional application No. 62/110,119, filed on Jan. 30, 2015, provisional application No. 61/941,576, filed on Feb. 19, 2014.

(51) Int. Cl.
*G06F 15/16* (2006.01)
*H04L 29/08* (2006.01)
(Continued)

(52) U.S. Cl.
CPC ...... *H04L 67/2842* (2013.01); *H04L 67/1014* (2013.01); *H04L 67/2814* (2013.01);
(Continued)

(58) Field of Classification Search
CPC ......... H04L 29/08144; H04L 29/08801; H04L 67/2842; H04L 67/1002; H04L 29/08738;
(Continued)

(56) References Cited

U.S. PATENT DOCUMENTS 6,578,068 B1    6/2003    Bowman-Amuah
6,678,793 B1    1/2004    Doyle
(Continued)

FOREIGN PATENT DOCUMENTS

CN    102640135 A    8/2012
CN    103563335 A    2/2014
(Continued)

OTHER PUBLICATIONS

International Search Report, dated Jun. 5, 2015, Int'l Appl.. No. PCT/US15/16628, Int'l Filing Date Feb. 19, 2015; 3 pgs.
(Continued)

*Primary Examiner* — Liang Che A Wang
*Assistant Examiner* — Johnny B Aguiar

(57) ABSTRACT

Aspects of the present disclosure involve systems, methods, computer program products, and the like, for providing failover and load clustering features to one or more proxy servers of a content delivery network (CDN). In one embodiment, one or more proxy servers may announce a virtual host internet protocol (IP) and, to provide a failover feature, two or more of the proxy servers may also announce a more generic virtual network IP address that includes a broader range of IP addresses associated with the virtual network IP address. In another embodiment, each of the proxy servers in communication with the router may announce a generic IP network address to the router. In response to receiving a request for content from an end user of the CDN, the router may select a proxy server and load balance the received requests among the proxy servers.

10 Claims, 5 Drawing Sheets

(51) Int. Cl.
*H04L 29/14* (2006.01)
*H04L 12/24* (2006.01)

(52) U.S. Cl.
CPC .. *H04L 29/08144* (2013.01); *H04L 29/08279* (2013.01); *H04L 29/08738* (2013.01); *H04L 29/08801* (2013.01); *H04L 41/0668* (2013.01); *H04L 67/1002* (2013.01); *H04L 67/1023* (2013.01); *H04L 67/1034* (2013.01); *H04L 69/40* (2013.01)

(58) Field of Classification Search
CPC ........... H04L 67/2814; H04L 29/08279; H04L 41/0668; H04L 67/1034; H04L 69/40
USPC ................. 709/217, 219, 224, 238, 239
See application file for complete search history.

(56) References Cited

U.S. PATENT DOCUMENTS

| | | | |
|---|---|---|---|
| 6,691,165 B1* | 2/2004 | Bruck | H04L 29/12009 709/227 |
| 6,842,906 B1 | 1/2005 | Bowman-Amuah | |
| 8,225,057 B1* | 7/2012 | Zheng | G06F 11/1458 711/114 |
| 8,533,254 B1 | 9/2013 | Whitson, Jr. et al. | |
| 8,819,187 B1 | 8/2014 | Hofmann | |
| 9,544,226 B1* | 1/2017 | Klausler | H04L 45/74 |
| 2003/0115346 A1 | 6/2003 | McHenry et al. | |
| 2003/0191822 A1 | 10/2003 | Leighton et al. | |
| 2006/0080546 A1 | 4/2006 | Brannon | |
| 2006/0250951 A1* | 11/2006 | Ueda | H04L 45/00 370/217 |
| 2007/0234115 A1* | 10/2007 | Saika | G06F 11/2028 714/13 |
| 2008/0010485 A1* | 1/2008 | Shitomi | G06F 11/2092 714/3 |
| 2009/0276311 A1 | 11/2009 | Pujet et al. | |
| 2010/0036947 A1 | 2/2010 | Krishnamurthy | |
| 2010/0036954 A1* | 2/2010 | Sakata | H04L 12/6418 709/226 |
| 2010/0217869 A1 | 8/2010 | Esteban | |
| 2011/0276623 A1 | 11/2011 | Girbal | |
| 2012/0096106 A1 | 4/2012 | Blumofe et al. | |
| 2012/0166591 A1 | 6/2012 | Eggleston | |
| 2012/0203873 A1 | 8/2012 | Lewin et al. | |
| 2012/0226649 A1 | 9/2012 | Kovacs et al. | |
| 2012/0275597 A1 | 11/2012 | Knox | |
| 2012/0317240 A1 | 12/2012 | Wang | |
| 2013/0041972 A1* | 2/2013 | Field | H04L 29/08729 709/213 |
| 2013/0159472 A1* | 6/2013 | Newton | H04L 67/2852 709/219 |
| 2013/0208591 A1 | 8/2013 | Larsen | |
| 2013/0227051 A1 | 8/2013 | Khakpour | |
| 2013/0246638 A1 | 9/2013 | Kovvali et al. | |
| 2014/0047539 A1 | 2/2014 | Holloway et al. | |
| 2015/0207660 A1 | 7/2015 | Sundaram | |
| 2015/0347248 A1* | 12/2015 | Ara Jo | G06F 11/2023 714/4.11 |

FOREIGN PATENT DOCUMENTS

| | | |
|---|---|---|
| WO | WO-2012144584 | 10/2012 |
| WO | WO-2013047207 | 4/2013 |

OTHER PUBLICATIONS

Written Opinion of the International Searching Authority, dated Jun. 5, 2015, Int'l Appl.. No. PCT/US15/16628, Int'l Filing Date Feb. 19, 2015; 6 pgs.
International Preliminary Report on Patentability, dated Aug. 23, 2016, Int'l Appl. No. PCT/US15/016612, Int'l Filing Date Feb. 19, 2015; 10 pgs.
International Preliminary Report on Patentability, dated Aug. 23, 2016, Int'l Appl. No. PCT/US15/016628, Int'l Filing Date Feb. 19, 2015; 8 pgs.
International Search Report, dated May 20, 2015, Int'l Appl. No. PCT/US15/016612, Int'l Filing Dated Feb. 19, 2015; 3 pgs.
Written Opinion of the International Searching Authority, dated May 20, 2015, Int'l Appl. No. PCT/US15/016612, Int'l Filing Dated Feb. 19, 2015; 8 pgs.
U.S. Appl. No. 14/626,425, filed Feb. 19, 2015, Power et al.
Extended European Search Report, dated Aug. 4, 2017, Application No. 15751589.1, filed Feb. 19, 2015; 8 pgs.
Extended European Search Report, dated Jul. 27, 2017, Application No. 15751742.6, filed Feb. 19, 2017; 8 pgs.
Chinese Examination Report, dated Dec. 5, 2018, Application No. 201580008829.9, filed Feb. 19, 2015, 17 pgs.
Japan Notification of Reasons for Refusal, dated Jan. 7, 2019, Application No. 2016-548708, filed Feb. 19, 2015, 7 pgs.

* cited by examiner

PROXY SERVER FAILOVER AND LOAD CLUSTERING

CROSS-REFERENCE TO RELATED APPLICATIONS

This application claims priority under 35 U.S.C. § 119(e) to U.S. Provisional Application No. 61/941,576 entitled "CONTENT DELIVERY NETWORK ARCHITECTURE WITH EDGE PROXY", filed on Feb. 19, 2014 and to U.S. Provisional Application No. 62/110,119 entitled "PROXY SERVER FAILOVER AND LOAD CLUSTERING", filed on Jan. 30, 2015, both of which are incorporated by reference in their entirety herein.

FIELD OF THE DISCLOSURE

Embodiments of the present invention generally relate to systems and methods for implementing a telecommunications network, and more specifically for providing failover and load clustering features to one or more proxy servers of a content delivery network.

BACKGROUND

Content Delivery Networks (CDN) are increasingly used to distribute content, such as videos, multimedia, images, audio files, documents, software, and other electronic resources, to end users on behalf of one or more content providers. Using a CDN allows the content providers to increase the speed and reliability of content delivery without deploying additional infrastructure. Moreover, a CDN allows for the distribution of the content through one or more existing networks without the need to store the content within the existing networks.

Typically, a CDN includes several content servers from which the content can be supplied to a requesting end user. In one example, these content servers may be accessed through a telecommunications network to which the end user is in communication. The network may include any number of components to facilitate the connection of the end user to the requested content, such as routers and proxy servers. However, in some instances, one or more of the components of the network may suffer a failure or be otherwise unable to provide the content to the end user. For example, one or more of the components may crash and cease operation until the component is restarted or a replacement component is included in the network. In another example, one or more of the components may be overwhelmed with traffic from the network such that one or more end users may no longer connect to the component for routing and transmission of the requested content. In such circumstances, availability of content from the CDN may be temporarily compromised through the network to the end user.

It is with these and other issues in mind that various aspects of the present disclosure were developed.

SUMMARY

One implementation of the present disclosure may take the form of method for operating a content delivery network. The method may include the operations of receiving a network Internet Protocol (IP) address announcement at a router from each of a plurality of proxy servers of a telecommunications network, the plurality of proxy servers in communication with a storage device configured to store a content file of the content delivery network (CDN) and wherein the network IP address from each of the plurality of proxy servers comprises a first range of IP addresses, receiving a request for the content file from an end user device in communication with the CDN, the request comprising at least a destination IP address for the content file, selecting a first proxy server of the plurality of proxy servers to provide the requested content file to the end user device, and transmitting the request for the content file to the first proxy server.

Another implementation of the present disclosure may take the form of a content delivery network. The content delivery network may comprise a router in communication with the content delivery network (CDN) and configured to receive a first request comprising at least a destination IP address for a content file from an end user device in communication with the CDN and a plurality of proxy servers in communication with the router and a storage device configured to store the content file of the CDN. Further, the router may further be configured to receive a network Internet Protocol (IP) address announcement comprising a first range of IP addresses from each of the plurality of proxy servers, select a first proxy server of the plurality of proxy servers to provide the requested content file to the end user device based at least on the network IP address, and transmit the first request for the content file to the first proxy server Yet another implementation of the present disclosure may take the form of method for providing failover protection in a telecommunications network. The method may include the operations of receiving a network Internet Protocol (IP) address announcement at a router from at least two proxy servers of the telecommunications network, the at least two proxy servers in communication with a storage device configured to store a content file of a content delivery network (CDN) and wherein the network IP address from each of the at least two proxy servers comprises a first range of IP addresses and receiving a host IP address announcement at the router from a first proxy server of the at least two proxy servers, the host IP address comprising a second range of IP addresses smaller than the first range of IP addresses. In addition, the method may include the operations of receiving an indication of a failure of the first proxy server of the at least two proxy servers, removing the host IP address from a routing table based at least on the received indication of the failure of the first proxy server, receiving a request for the content file from an end user device in communication with the CDN, selecting a second of the at least two proxy server of the plurality of proxy servers to provide the requested content file to the end user device, and transmitting the request for the content file to the second proxy server.

DETAILED DESCRIPTION

Aspects of the present disclosure involve systems, methods, computer program products, and the like, for providing failover and load clustering features to one or more proxy servers of a content delivery network (CDN). In one embodiment, the CDN may include a plurality of proxy servers in communication with a router through which the requests for content from one or more of the proxy servers may be received. One or more of the proxy servers may announce a virtual host internet protocol (IP) address that identifies the proxy server as a device through which a particular content of the CDN is available. The virtual IP addresses may be announce through a border gateway protocol (BGP) session with the router. The virtual host IP address may be a specific IP address for the content or a host IP route address when the content is retrieved from a storage device. To provide a failover feature to the plurality of proxy servers in communication with the router, two or more of the proxy servers (including the proxy server that provides the virtual host IP address or host IP route) may also announce a more generic virtual network IP address that includes a broader range of IP addresses associated with the virtual network IP address. Thus, if the proxy server that announces the host IP address fails or is otherwise inoperable, the router may route requests for content to one of the other proxy servers that have announced the virtual network IP address. In this manner, by announcing a specific IP address from one proxy server and a generic IP address from another proxy server, one or more of the proxy servers may receive requests for content in the circumstance when a particular proxy server fails.

In another embodiment, each of the proxy servers in communication with the router may announce a generic IP network address to the router. In response to receiving a request for content from an end user of the CDN, the router may select a proxy server through which the content is provided to the end user. In one example, the router may calculate a hash value from information contained in the request for content. Based on the hash value, the router selects one of the proxy servers to provide the content. Further, by spreading the selection of a proxy server among the possible hash values, the router may load balance requests for content among the proxy servers. In this manner, by announcing a generic IP network address from each or some of the available proxy servers, the router may provide a load balance feature among the available proxy servers from which a particular content from the CDN is available.

Figure 1:
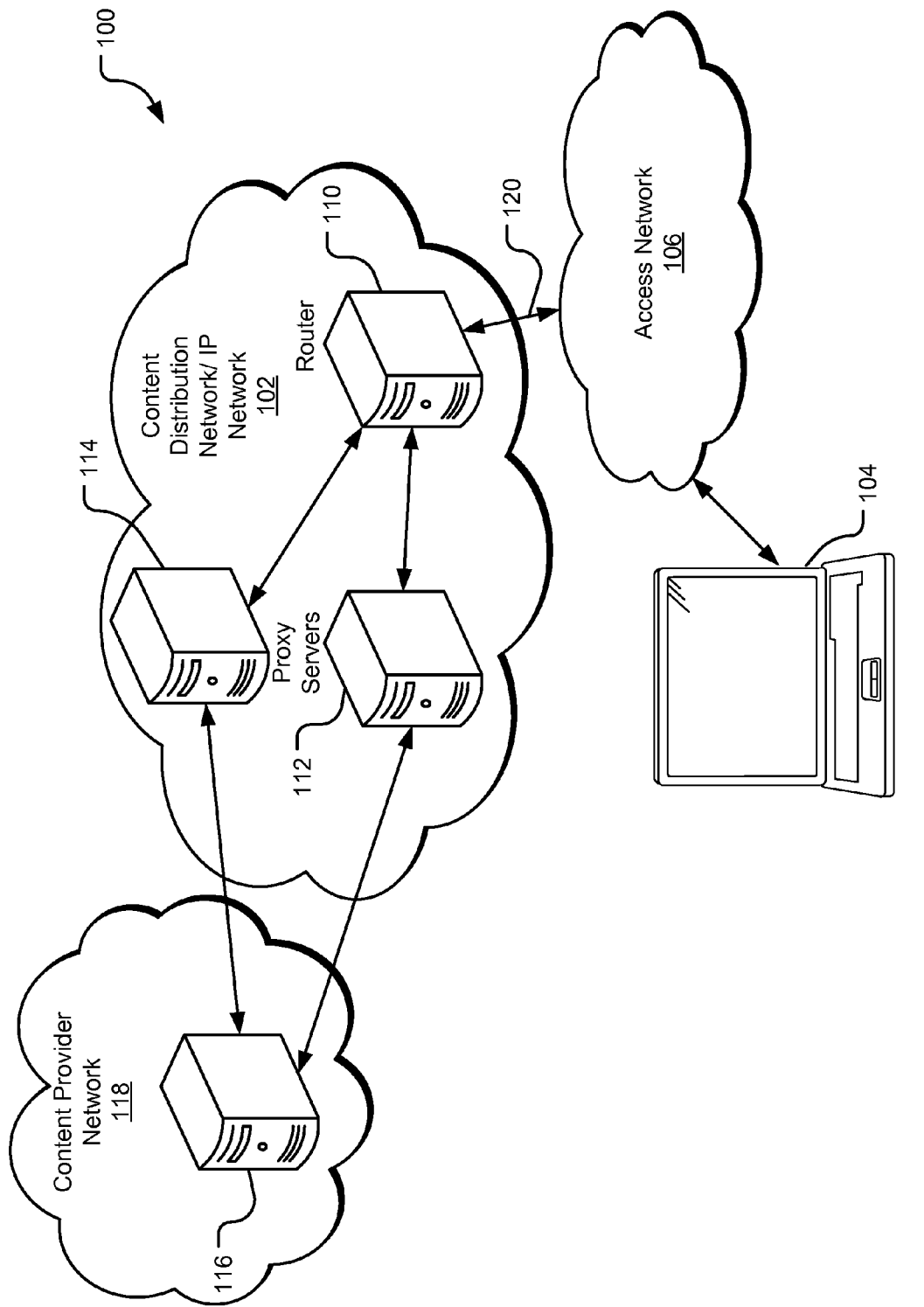
FIG. 1 is an example network environment for distributing content over a content delivery network (CDN).

FIG. 1 is an example network environment 100 for distributing content to one or more users. In one implementation, a CDN 102 is communicably coupled to one or more access networks 106. In general, the CDN 102 comprises one or more content servers (discussed in more detail below) and/or proxy servers configured to provide content upon a request and an underlying IP network through which the request is received and the content is provided. The underlying IP network associated with the CDN servers may be of the form of any type IP-based communication network configured to transmit and receive communications through the network and may include any number and types of telecommunications components. In this manner, CDN proxy servers may be added to an existing IP-based communication network such that the CDN proxy servers receive a request for content, retrieve the content from a content provider network 116, and provide the content to the requesting device through the supporting IP network. For simplicity, the use of the term "CDN" throughout this disclosure refers to the combination of the one or more content servers and the underlying IP network for processing and transmitting communications, unless otherwise noted.

In one embodiment, the access network 106 may be under the control of or operated/maintained by one or more entities, such as, for example, one or more Internet Service Providers (ISPs) that provide access to the CDN 102. Thus, for example, the access network 106 may provide Internet access to a user device 104. In addition, the access network 106 may include several connections to the IP network of the CDN 102. For example, access network 106 includes access point 120. Also, the user device 104 may be connected to any number of access networks 106 such that access to the CDN 102 may occur through another access network. In general, access to a CDN 102 (or underlying IP network associated with the CDN) may occur through any number of ingress ports to the CDN through any number of access networks.

The CDN 102 is capable of providing content to a user device 104, which is generally any form of computing device, such as a personal computer, mobile device, tablet (e.g., iPad), or the like. Content may include, without limitation, videos, multimedia, images, audio files, text, documents, software, and other electronic resources. The user device 104 is configured to request, receive, process, and present content. In one implementation, the user device 104 includes an Internet browser application with which a link (e.g., a hyperlink) to a content item may be selected or otherwise entered, causing a request to be sent to a directory server 110 in the CDN 102.

The request for content may be received at a router 110 of the CDN. In one particular embodiment, the request is transmitted through several components of the IP network before being received at the router. In addition, the CDN 102 may include a directory server configured to respond to the request by providing a network address (e.g., an IP address within an IP network) where the content associated with the selected link can be obtained. The directory server resolves the link name (e.g., URL or other identifier) to an associated network address from which the user device 104 can retrieve the content.

In one implementation, the CDN 102 includes one or more edge servers 112, 114 (also sometimes referred to as an "edge server"), which may cache content from another server to make it available in a more geographically or logically proximate location to the router 110 and/or user device 104. The proxy servers 112, 114 may reduce network loads, free capacity, lower delivery costs, and/or reduce content download time. The proxy servers 112, 114 are configured to provide requested content to a requestor, which may be the user device 104 or an intermediate device, for example, in the access network 106. In one implementation, the one or more of the proxy servers 112, 114 provide the requested content that is locally stored in cache. In another implementation, the proxy servers 112, 114 retrieve the requested content from another source, such as a media access server (MAS) (e.g., a content distribution server or a content origin server 116 of a content provider network 118). The content is then served to the user device 104 in response to the requests.

Figure 2:
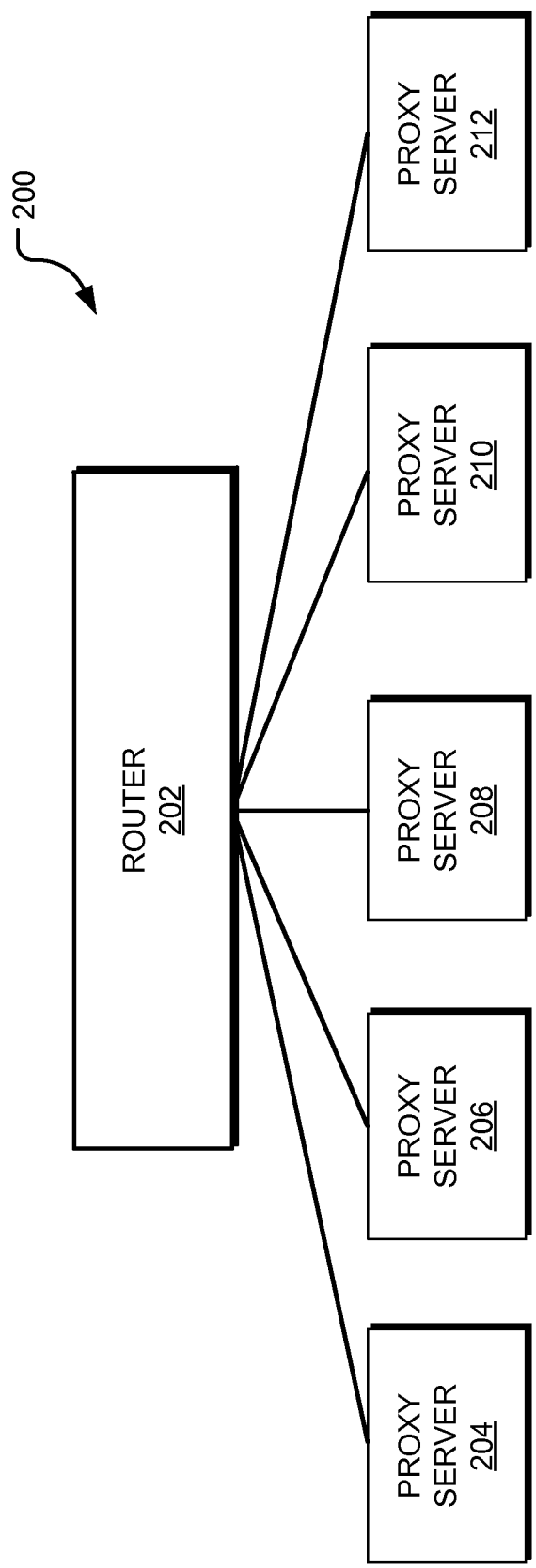
FIG. 2 is an example network environment for routing a request for content from a CDN a proxy server of the network.

FIG. 2 is an example network environment for routing a request for content from a CDN a proxy server of the network. In particular, FIG. 2 illustrates one embodiment of the router 110 and proxy servers 112, 114 from FIG. 1. Thus, the network 200 of FIG. 2 includes a router 202 in communication with a plurality of proxy servers 204-212. Although not shown in FIG. 2, it should be appreciated that the components discussed above and shown in FIG. 1, as well as additional networking and computing components, may be in connected to or otherwise in communication with the components of the network 200. In particular, the router 202 may be connected with or part of an IP network to receive requests for content from an end user connected to the network. Also, one or more of the proxy servers 204-212 may be connected to or otherwise in communication with a content provider network or content storage device to access the content in response to receiving a request. As explained above, the proxy servers 204-212 may also store some content that is utilized often by the network. In this manner, the proxy servers 204-212 may act as content storage devices for the CDN and/or as router devices to access the content stored on a separate content storage device.

As shown, the proxy servers 204-212 are in communication with the router 202. In one particular example, the proxy servers 204-212 include a 20 Gigabyte connection or connections with the router 202. In another example, the proxy servers 204-212 include a 40 Gigabyte connection or connections with the router 202. In general, any type of network connection between the router 202 and the proxy servers 204-212 may be present. Further, the proxy servers 204-212 may not be directly connected to the router 202, but instead may be in communication through a network and/or any number of network devices. As explained in more detail below, the router 202 is configured to receive packets from a telecommunications network and, based at least on a routing protocol and an address included in one or more of the received packets, route the packets to one or more of the proxy servers 204-212. In one particular example, packets include a request for content from a CDN.

The proxy servers 204-212 are generally configured to obtain and provide the content of the CDN, either through storing some of the content requested through the CDN and/or further transmitting the received packets to a storage device from which the content is obtained. As such, when a request for content is received from the end user through the CDN, the router 202 analyzes an address associated with the request and determines which proxy server 204-212 obtains the content. The router 202 then transmits the request on to the selected proxy server 204-212. Upon receiving the request from the router 202, the proxy server 204-212 either provides the requested content or obtains the requested content from a storage device and then provides the content. In either event, any proxy server 204-212 may be configured to provide any content from a storage device such that the cluster of proxy servers is scalable.

Some disruption of service may occur in providing the requested content when a proxy server 204-212 is unable to obtain and provide the content. For example, one or more of the proxy servers 204-212 may crash or be otherwise inoperable to provide content for some reason. In such a case, end users connected to or receiving content from the failed proxy servers 204-212 may have their session interrupted or may not be able to access content from the proxy servers. In another example, one or more of the proxy servers 204-212 may be overwhelmed with requests for content, such as during a denial of service attack on the server. If too many end users request content from the proxy server, one or more of the end users may not be able to access or otherwise communicate with the proxy server.

When a proxy server 204-212 crashes or becomes unavailable, it may take some time before end users connected to the failed proxy server is transferred to another proxy server. As should be appreciated, such circumstances may be undesirable for an operator of the CDN as access to some content hosted by the CDN may be unavailable to one or more users of the network.

Figure 3:
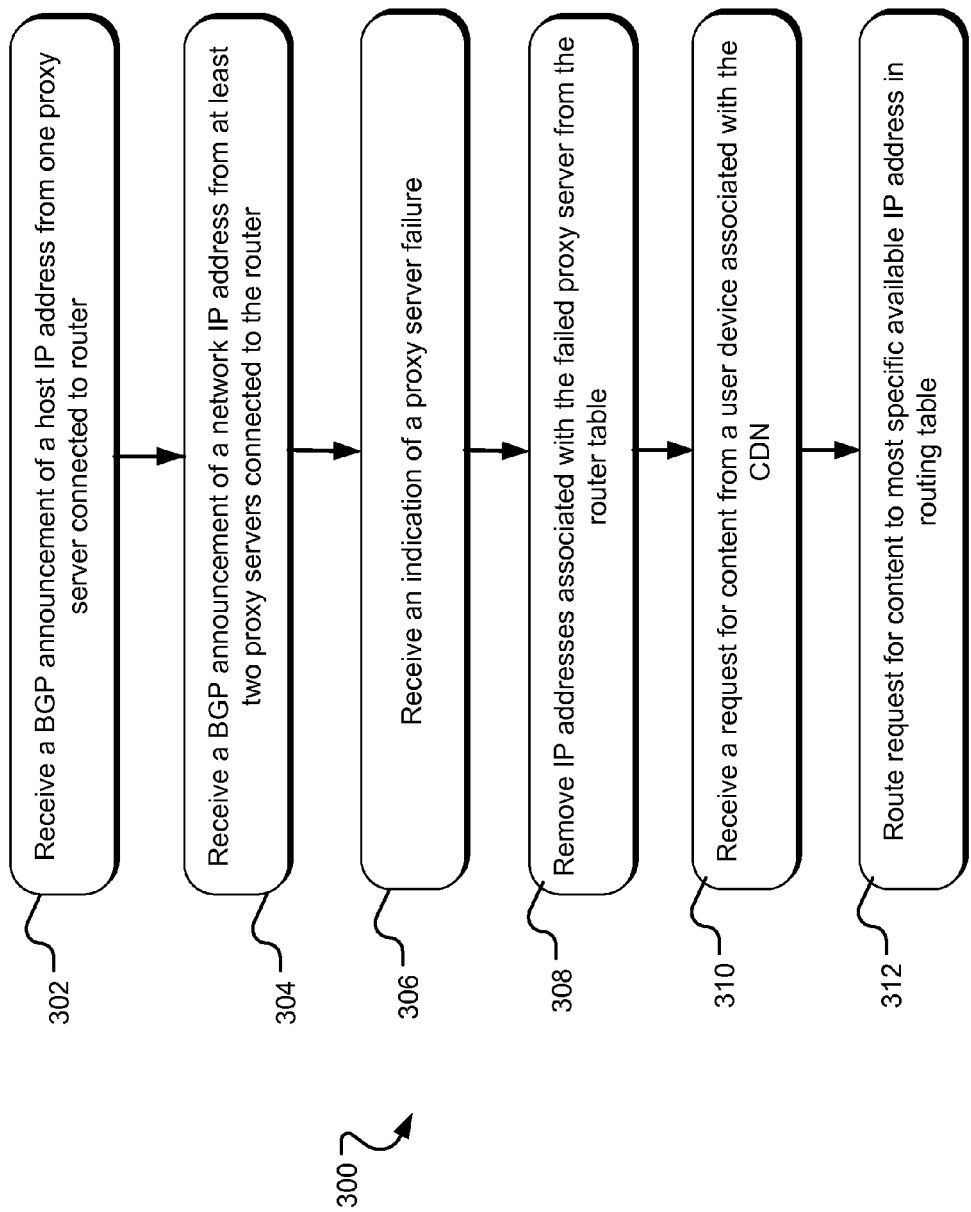
FIG. 3 is a flowchart illustrating a method for a CDN to utilize a Border Gateway Protocol (BGP) announcement to provide a failover feature to a router of a network.

The present disclosure describes some methods to address the potential failure of one or more proxy server 204-212 in the CDN. In particular, FIG. 3 is a flowchart illustrating one method for a CDN to utilize a Border Gateway Protocol (BGP) announcement to provide a failover feature to a router of a network in communication with a plurality of proxy servers. In general, the operations of the method of FIG. 3 may be performed by one or more routers of the CDN, but may be performed by another number and type of components of the telecommunications network. The operations of the method are described below with reference to the network 200 of FIG. 2. However, it should be appreciated that the operations may be performed by any network configuration discussed herein or otherwise known.

Beginning in operation 302, the router 202 receives a BGP announcement message from one proxy server 204-212 in communication with the router of a host Internet Protocol (IP) address that indicates that a particular content of the CDN may be located at the announcing proxy server. In general, the router 202 and the proxy server (in this example, proxy server 204) may enter a BGP session in which the proxy server announces one or more virtual IP addresses for content available from the proxy server. The announced virtual IP addresses may be stored by the router 202 for routing of requests for content. In particular, the router 202 may receive a request for content available from one or more of the proxy servers 204-212. Based on information stored in the header of the request, the router 202 determines where the request should be routed. In particular, the router 202 compares the information in the header of the request to a stored routing table to determine how the request is routed. In one embodiment, the information in the routing table is populated through BGP announcements from the proxy servers 204-212 (as well as other components within the network).

The host virtual IP address announced by the proxy server 204 may be any type of IP address associated with content available through the CDN. In one particular example, however, the virtual IP address may include a Classless Inter-Domain Routing (CIDR) type of IP address. In general, CIDR notation in an IP address allows for the announcement of a range of IP addresses. CIDR notation for an IP address includes a typical IP address with a slash and a decimal number appended to the end of the address. The slash and decimal number appended to the IP address allows for aggregation of contiguous addresses. Thus, sixteen contiguous /24 networks can be aggregated as a single /20 route if the first 20 bits of the IP addresses match. This allows for a reduction in the number of routes that need be announced through the BGP session. Also, as should be appreciated, a higher decimal value after the slash character in the IP address indicates a smaller range of IP addresses associated with the component, such that an IP address ending with /32 is more specific than an IP address ending with /25.

As mentioned above, a proxy server 204 may announce a virtual IP address to the router 202 for the availability of content through the proxy server. In one example, the virtual IP address announced by the proxy server 204 may be a specific host IP address for the content. The specific host IP address may be used when the content is stored at the proxy server 204. For example, the host IP address may be IP address 4.2.2.126. However, the proxy server 204 may also act as a router to a storage device that stores the requested content. As such, the virtual IP address announced by the proxy server 204 may be a host IP route and may include a CIDR notation for the host IP route. For example, the host IP route may be the IP address 4.2.2.1/32. The IP host address and/or IP host route address indicates to the router 202 (and the network connected to the router) that the content associated with the IP host address may be located at the proxy server 204. In one embodiment, the IP host address and the IP host route address may be provided by the directory server of the CDN and announced during a BGP session with the proxy server 204.

In operation 304, the router receives a virtual network IP address announcement from the proxy server 204 from which the host IP address or host IP route was announced and at least one other proxy server (for example, proxy server 206) in communication with the router 202. In general, the virtual network IP address announced by the one or more proxy servers 204, 206 is less specific than the virtual host IP address or route. Utilizing the example above, proxy server 204 and proxy server 206 may announce a network IP address of 4.2.2.0/25. Thus, because the network IP address includes a CIDR notation of /25 and the host IP route address includes a CIDR notation of /32, the host IP route address is more specific (as it includes a smaller range of IP addresses encompassed by the CIDR notation). The virtual network IP addresses announced by the proxy server 204, 206 may be stored in a routing table for the router 202.

Although discussed above as including proxy server 204 and proxy server 206, it should be appreciated that the network IP address may be announced from any number of the proxy server 204-212 in communication with the router 202. For example, the network IP address may be announced from proxy server 204, proxy server 208, and proxy server 210. In one particular embodiment, the number of proxy servers 204-212 announcing the network IP address is limited to three proxy servers. In another example discussed in more detail below, each proxy server 204-212 in communication or otherwise assigned to the router 202 may announce the same network IP address.

As mentioned above, the router 202 is configured to route a received request for content to a proxy server based at least on the routing table stored by the router. In particular, the router 202 may route a received request to the proxy server 204-212 to which the router has the most specific IP address. For example, although the router 202 has two stored IP addresses for a particular content as discussed above, the router may route requests for the content to proxy server 204 over proxy server 206 because the host IP address announced by proxy server 204 is more specific than the network IP address announced by proxy server 206. As such, all requests for the content associated with the host IP address is routed to proxy server 204 when received at the router 202.

However, in some circumstances, proxy server 204 may become unavailable to provide the content. For example, the proxy server 204 may fail or crash and become inoperable. In such a circumstance, the router 202 may receive an indication of the proxy server 204 failure in operation 306. In response, the router 202 may remove the IP addresses in the routing table of the router associated with the failed proxy server 204 in operation 308. In other words, because the proxy server 204 is unavailable to provide or obtain content, the router 202 removes the possibility of routing requests to the proxy server. Continuing the above example, the router may then remove the host IP address or route of the proxy server 204.

In operation 310, the router 202 receives a request for content from a user device associated with the CDN. This request is similar to the request discussed above. However, in this instance, the proxy server 204 through which the content may be retrieved has failed. Thus, in operation 312, the router 202 consults the routing table and routes the request to the most specific route available associated with the destination IP address of the request. Because proxy server 206 has announced the network IP address, the router 202 may then route the request to proxy server 206.

Through the operations above, the proxy servers 204-212 provide a failover alternative proxy server to the router 202 to receive requests and provide content to the CDN. As discussed, proxy server 204 may handle requests for the content while operational because of the IP host address announced the proxy server. However, in circumstances where proxy server 204 fails, requests may be transmitted to proxy server 206 based on the network IP address announced by the proxy server 206. The routing of requests to the failover proxy server 206 may occur faster than previous configurations of the network that attempt to find alternative paths to the content when a proxy server fails. Rather, because the less specific network IP address announced by the failover proxy server 206 is already included in the routing table when the preferred proxy server 204 fails, the routing of additional requests to the failover proxy server 206 occurs quickly.

In addition, the failover proxy server 206 may pick up the one or more sessions being handled by the preferred proxy server 204 upon a failure. In general, a content session may include several requests for portions of the content, such as segments of a video file. Although some of the segments may be lost or otherwise not provided to the end user upon the failure of the proxy server 204, any requests for the segments that arrive at the router 202 after the failure of proxy server 204 are automatically routed to the failover proxy server 206 based on the less specific network IP address announced by the failover proxy server.

Through the above method, a plurality of proxy servers 204-212 may include a failover feature for content available through the proxy servers. However, in some circumstances, the additional requests transmitted to the failover proxy server 206 may result in the failover proxy server being overwhelmed with requests such that operation of the proxy server is compromised. As such, a load balancing feature may be included in the network 200 configuration that attempts to balance the requests for content received at the router 202 among the proxy servers 204-212 in communication with the router. One such configuration of the network 200 to provides a load balancing feature (and in some circumstance, in addition to the failover feature) is presented below.

Figure 4:
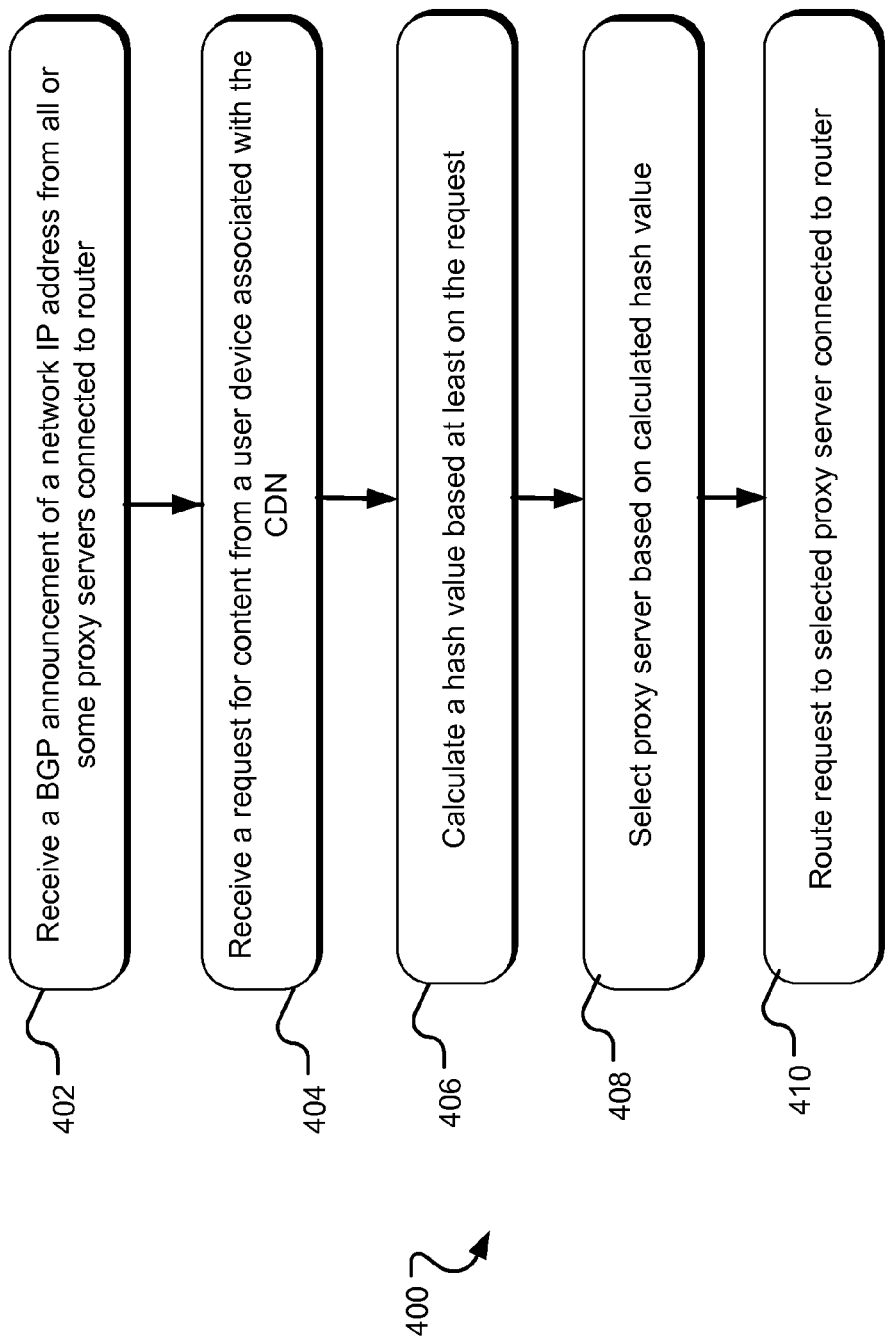
FIG. 4 is a flowchart illustrating a method for a CDN to utilize a Border Gateway Protocol (BGP) announcement to provide a load balancing between several proxy servers of a network.

In particular, FIG. 4 is a flowchart illustrating a method for a CDN to utilize a Border Gateway Protocol (BGP) announcement to provide a load balancing between several proxy servers of a network. Similar to the method of FIG. 3, operations of the method of FIG. 4 may be performed by one or more routers of the CDN, but may be performed by another number and type of components of the telecommunications network. The operations of the method are described below with reference to the network 200 of FIG. 2. However, it should be appreciated that the operations may be performed by any network configuration discussed herein or otherwise known.

Beginning in operation 402, the proxy servers 204-212 in communication or otherwise associated with the router 202 announce a network IP address through a BGP session with the router. The network IP address announced by the proxy servers 204-212 may be similar to the network IP address discussed above. Therefore, in one example, the network IP address may be include a CIDR notation, such as a network IP address of 4.2.2.0/25. In general, the network IP address announced by the proxy servers 204-212 may include any form of an IP address that provides an indication of a range of IP addresses of a network. By announcing a network IP address that includes a range of IP addresses, the proxy servers 204-212 appear to the router 202 as connections to a network. As discussed in more detail below, the announcement of the network IP address from each proxy server 204-212 allows the router 202 to provide a request for content to any of the proxy servers based on the destination IP address included in the request.

In operation 404, the router 202 receives a request for content from a user device associated with the CDN. This request is similar to the request discussed above. However, as the routing table does not include one route that is more specific than any other qualifying route, the router 202 may transmit the request to any of the proxy servers 204-212. To select which proxy server 204-212 of the available proxy servers to which the request is routed, the router may calculate a hash value in operation 406. In general, the hash value may be any repeatable value determined from the request to select one of the proxy servers 204-212 to route the request. In one particular embodiment, the router 202 may utilize information in the request header, such as the source address, destination address, source ports, and the like included in the header of the request to calculate the hash value. By utilizing the information in the request header, the hash value may be repeatable for a particular content retrieving session as such information in the header may not differ from request to request within the session. In other words, by utilizing the information in the header that remains the same during the session, a single proxy server 204-212 is selected to provide all of the requested content, as long as the selected proxy server does not fail during the session.

The calculated hash value may then be utilized to select a proxy server 204-212 from the available proxy servers to transmit the request in operation 408. For example, each proxy server 204-212 that announces the network IP address may be assigned a range of hash values by the router 202. Thus, upon the calculation of the hash value, the router 202 may determine which proxy server 204-212 is associated with the hash value and select that proxy server through which the requested content is retrieved. In operation 410, the router 202 may then transmit the request to the selected proxy server 204-212 for fulfillment of the request for the content. In this manner, the router 202 may load balance requests for content from the CDN among the available proxy servers 204-212 based at least on the network IP address announced by each of the proxy servers.

Through the operations above, any proxy server 204-212 in communication with the router 202 that announces the network IP address may fulfill the request for content from the CDN. Thus, the router 202 may load balance the requests among the various proxy servers 204-212 as the requests are received. In addition, by calculating a hash value to select a proxy server that is the same for an entire content session, each portion of a requested content may be provided by a single proxy server. Further, the router 202 may provide a failover protection for the plurality of proxy servers 204-212 available. For example, in the circumstance where one or more of the proxy servers 204-212 become unavailable to provide content, the router 202 may become aware of the unavailable proxy server and adjust the hash value calculation accordingly. In other words, the router 202 may adjust the hash value calculation to return values that indicate one of the remaining available proxy servers. Thus, when a request for content is received at the router 202, the calculation of the hash value may return a value for a remaining available proxy server from which the content is provided. In this manner, the router 202 provides a failover feature to the proxy server 204-212 selection of the proxy servers should one of the servers fail.

Utilizing a BGP announcement session to announce a specific virtual host IP address or route and a more generic (or broader to include a larger range of IP addresses) network IP address, a plurality of proxy servers 204-212 may provide a failover feature and/or a load balancing feature to a router 202 in communication with the plurality of proxy servers. Specifically, a virtual network IP address announced from the proxy servers 204-212 may allow the router 202 to select a proxy server to provide the content to an end user in a balanced manner. In addition, one or more of the proxy servers 204-212 may be identified as a preferred proxy server to provide the content through the proxy server announcing a more specific virtual IP host address. As should be appreciated, the methods discussed herein may be performed by any networking device or devices to provide a failover and/or load balancing feature by the number and type of IP addresses announced by the devices during a BGP session.

Figure 5:
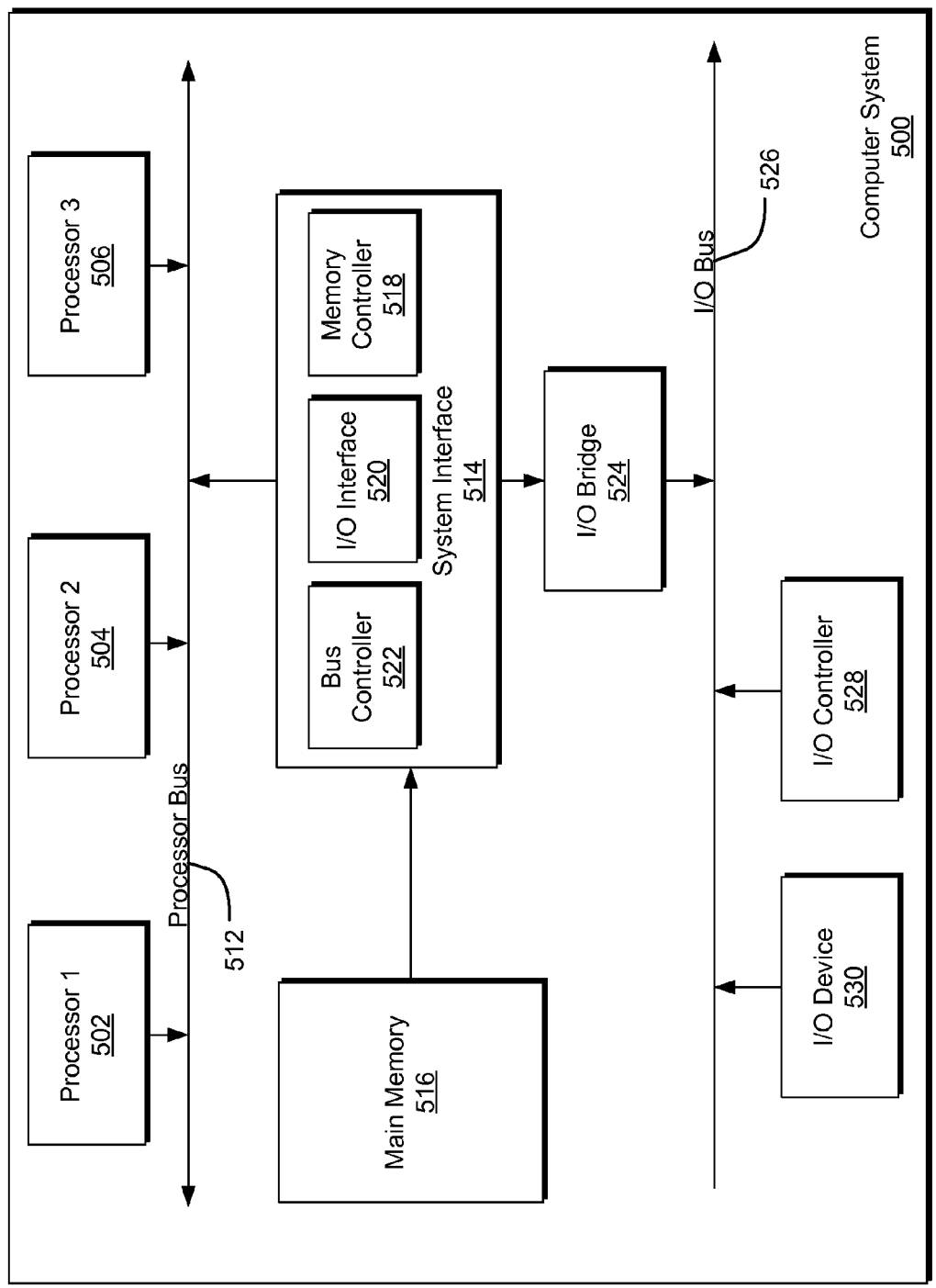
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be used to implement the router or proxy servers discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 540, as illustrated.

I/O device 540 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for operating a content delivery network, the method comprising:

receiving a network Internet Protocol (IP) address announcement at a router from each of a plurality of proxy servers of a telecommunications network, the plurality of proxy servers comprising a first proxy server and a second proxy server, wherein the plurality of proxy servers are in communication with a storage device configured to store a content file of the content delivery network (CDN) and wherein the network IP address announcement from the first proxy server comprises a network IP address that comprises a first range of IP addresses and the network IP address announcement from the second proxy server also comprises the network IP address comprising the first range of IP addresses;

receiving a host IP address announcement at the router from the first proxy server, the host IP address comprising a second range of IP addresses, wherein the second range of IP addresses is smaller than the first range of IP addresses;

receiving a first request for the content file from an end user device in communication with the CDN, the first request comprising at least a destination IP address for the content file;

determining, by the router, that the second range of IP addresses is smaller than the first range of IP addresses by comparing a Classless Inter-Domain Routing (CIDR) address for the network IP address to a CIDR address for the host IP address;

selecting the first proxy server of the plurality of proxy servers to provide the requested content file to the end user device based on determining that the second range of IP addresses is smaller than the first range of IP addresses;

transmitting the first request for the content file to the first proxy server;

receiving an indication of a failure of the first proxy server of the plurality of proxy servers;

removing the host IP address from a routing table based at least on the received indication of the failure of the first proxy server;

receiving a second request for the content file, the second request including the destination IP address;

determining that the network IP address is a most-specific IP address remaining in the routing table for the content file;

routing the second request for the content file to the second proxy server of the plurality of proxy servers; and providing, by the second proxy server, the content file to the end user device.

2. The method of claim 1 further comprising calculating a hash value based on at least the destination IP address of the first request for the content file.

3. The method of claim 1 wherein the network IP address announcement is received through a Border Gateway Protocol (BGP) session with the first proxy server.

4. The method of claim 1 wherein the host IP address announcement is received through a BGP session with the first proxy server.

5. A content delivery network comprising:

a router in communication with the content delivery network (CDN) and configured to receive a first request comprising at least a destination IP address for a content file from an end user device in communication with the CDN; and a plurality of proxy servers comprising a first proxy server and a second proxy server, wherein the plurality of proxy servers are in communication with the router and a storage device configured to store the content file of the CDN;

wherein the router is further configured to:
receive an announcement from the first proxy server of a network Internet Protocol (IP) address comprising a first range of IP addresses and an announcement from the second proxy server of the network IP address comprising the first range of IP addresses;
receive a host IP address announcement from the first proxy server, the host IP address comprising a second range of IP addresses, wherein the second range of IP addresses is smaller than the first range of IP addresses;
determine that the second range of IP addresses is smaller than the first range of IP addresses by comparing a Classless Inter-Domain Routing (CIDR) address for the network IP address to a CIDR address for the host IP address;
select the first proxy server to provide the requested content file to the end user device based at least on the network IP address and the determination that the second range of IP addresses is smaller than the first range of IP addresses;
transmit the first request for the content file to the first proxy server;
remove the host IP address from a routing table based on receipt of an indication of a failure of the first proxy server of the plurality of proxy servers;
receive a second request for the content file, the second request including the destination IP address;
determine that the network IP address is a most-specific IP address remaining in the routing table for the content file; and
route the second request for the content file to the second proxy server of the plurality of proxy servers; and
provide, by the second proxy server, the content file to the end user device.

6. The content delivery network of claim 5 where the router is further configured to calculate a hash value based on at least the destination IP address of the first request for the content file.

7. The content delivery network of claim 5 wherein the network IP address announcement and the host IP address are received at the router through a Border Gateway Protocol (BGP) session with the first proxy server.

8. A non-transitory computer-readable medium encoded with instructions executable by a processor to:
receive a network Internet Protocol (IP) address announcement at a router from at least two proxy servers of a telecommunications network, the at least two proxy servers in communication with a storage device configured to store a content file of a content delivery network (CDN) and wherein the network IP address from both of the at least two proxy servers comprises a first range of IP addresses;
receive a host IP address announcement at the router from a first proxy server of the at least two proxy servers, the host IP address comprising a second range of IP addresses smaller than the first range of IP addresses;
store the network IP address in a routing table for each of the at least two proxy servers and storing the host IP address in the routing table for the first proxy server;
receive a first request for the content file from an end user device in communication with the CDN, the first request comprising at least a destination IP address for the content file;
determine, by the router, that the second range of IP addresses is smaller than the first range of IP addresses by comparing a Classless Inter-Domain Routing (CIDR) address for the network IP address to a CIDR address for the host IP address;
select the first proxy server to provide the requested content file to the end user device based at least on determining that the second range of IP addresses is smaller than the first range of IP addresses;
receive, after storing the network IP address in the routing table for each of the at least two proxy servers and storing the host IP address in the routing table for the first proxy server, an indication of a failure of the first proxy server of the at least two proxy servers;
remove the host IP address from the routing table based at least on the received indication of the failure of the first proxy server;
receive a second request for the content file, the second request including the destination IP address;
determine that the network IP address is a most-specific IP address remaining in the routing table for the content file;
route the second request for the content file to a second proxy server of the at least two proxy servers; and
provide, by the second proxy server, the content file to the end user device.

9. The non-transitory computer-readable medium of claim 8 wherein the network IP address announcement is received through a Border Gateway Protocol (BGP) session with the at least two proxy servers.

10. The non-transitory computer-readable medium of claim 8 wherein the host IP address announcement is received through a BGP session with the first proxy server.

* * * * *